US011278815B2

(12) United States Patent
Kulavik et al.

(10) Patent No.: US 11,278,815 B2
(45) Date of Patent: *Mar. 22, 2022

(54) METHOD AND SYSTEM FOR A HEADSET WITH PARENTAL CONTROL

(71) Applicant: Voyetra Turtle Beach, Inc., Valhalla, NY (US)

(72) Inventors: Richard Kulavik, San Jose, CA (US); Michael A. Jessup, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,388

(22) Filed: Apr. 9, 2019

(65) Prior Publication Data

US 2019/0232171 A1 Aug. 1, 2019

Related U.S. Application Data

(63) Continuation of application No. 14/457,936, filed on Aug. 12, 2014, now Pat. No. 10,258,887.

(Continued)

(51) Int. Cl.
*A63F 13/79* (2014.01)
*A63F 13/212* (2014.01)
(Continued)

(52) U.S. Cl.
CPC ............ *A63F 13/79* (2014.09); *A63F 13/212* (2014.09); *A63F 13/215* (2014.09); *A63F 13/98* (2014.09);
(Continued)

(58) Field of Classification Search
CPC ...... A63F 13/79; A63F 13/212; A63F 13/215; A63F 13/98; A63F 13/73; H04R 1/1041; H04R 5/033; H04R 5/04
(Continued)

(56) References Cited

U.S. PATENT DOCUMENTS 10,258,887 B2 4/2019 Kulavik et al.
2003/0216183 A1* 11/2003 Danieli ................... A63F 13/12
463/42
(Continued)

FOREIGN PATENT DOCUMENTS

WO WO-2009137147 A1 * 11/2009 .......... H04M 1/6066

*Primary Examiner* — Allen Chan
(74) *Attorney, Agent, or Firm* — McAndrews, Held & Malloy, Ltd.

(57) ABSTRACT

A gaming headset receives a plurality of audio channels during play of a particular game, determines an identity and/or an age of a gamer that is wearing the gaming headset, and configures operation of the gaming headset based on the determined identity and/or age of the gamer. The gaming headset logs into the particular game using credentials associated with the determined identity and/or age, and selects settings based on the determined identity and/or age of the gamer that is wearing the gaming headset. One or more sensors communicatively coupled to the gaming headset may be activated and information received from the sensors is utilized to determine the identity and/or the age of the gamer that is wearing the gaming headset. The sensors determine, for example, the head size, ear size, voice characteristics and/or biometric information for the gamer that is wearing the gaming headset.

20 Claims, 13 Drawing Sheets

Related U.S. Application Data

(60) Provisional application No. 61/895,475, filed on Oct. 25, 2013.

(51) Int. Cl.
*A63F 13/98* (2014.01)
*A63F 13/215* (2014.01)
*A63F 13/73* (2014.01)
*H04R 1/10* (2006.01)
*H04R 5/033* (2006.01)
*H04R 5/04* (2006.01)

(52) U.S. Cl.
CPC ............ *A63F 13/73* (2014.09); *H04R 1/1041* (2013.01); *H04R 5/033* (2013.01); *H04R 5/04* (2013.01)

(58) Field of Classification Search
USPC .......................................................... 463/29
See application file for complete search history.

(56) References Cited

U.S. PATENT DOCUMENTS

| | | | |
|---|---|---|---|
| 2006/0025206 A1* | 2/2006 | Walker | G07F 17/32 463/20 |
| 2006/0058103 A1* | 3/2006 | Danieli | A63F 13/12 463/42 |
| 2007/0202950 A1 | 8/2007 | Hussaini | |
| 2009/0281809 A1 | 11/2009 | Reuss | |
| 2010/0075631 A1* | 3/2010 | Black | G07C 9/257 455/410 |
| 2010/0245585 A1* | 9/2010 | Fisher | G06F 1/1686 348/164 |
| 2012/0184362 A1* | 7/2012 | Barclay | G07F 17/3281 463/25 |
| 2012/0214564 A1* | 8/2012 | Barclay | G07F 17/3227 463/11 |

* cited by examiner

METHOD AND SYSTEM FOR A HEADSET WITH PARENTAL CONTROL

PRIORITY CLAIM

This application is a continuation of U.S. application Ser. No. 14/457,936 filed on Aug. 12, 2014, now U.S. Pat. No. 10,258,887, which claims the benefit of priority to U.S. provisional patent application 61/895,475 titled "Method And System For A Headset with Parental Control," which is hereby incorporated herein by reference in its entirety.

INCORPORATION BY REFERENCE

Each of the following applications is hereby incorporated herein by reference in its entirety:
U.S. patent application Ser. No. 13/040,144 titled "Gaming Headset with Programmable Audio" and published as US2012/0014553; and
U.S. patent application Ser. No. 14/263,210 titled "Electronic Headset Accessory."

TECHNICAL FIELD

Aspects of the present application relate to electronic gaming. More specifically, to methods and systems for a headset with parental control.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for a headset with parental control, substantially as illustrated by and/or described in connection with at least one of the figures, as set forth more completely in the claims.

DETAILED DESCRIPTION

Figure 1A:
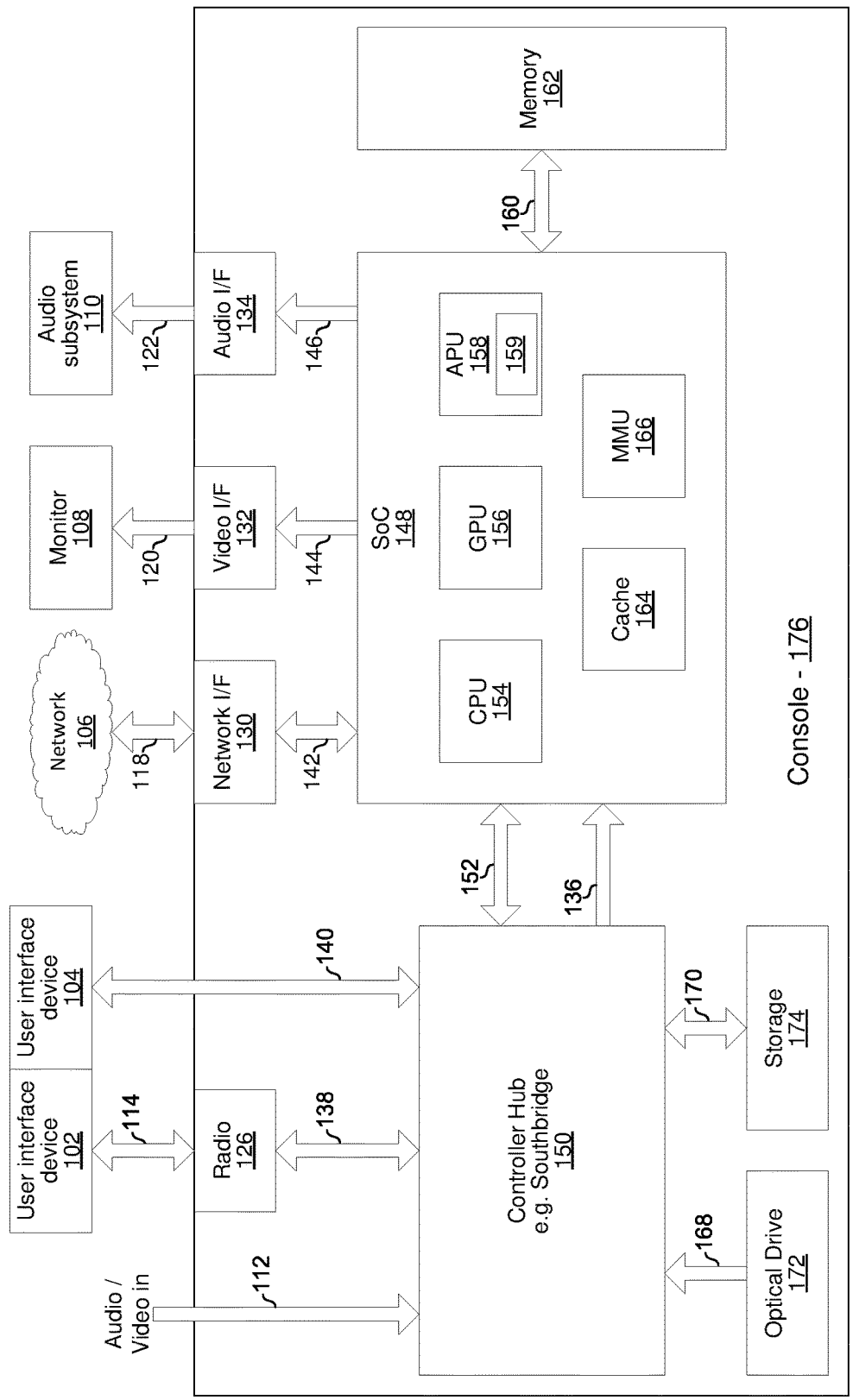
FIG. 1A is a diagram that depicts an example gaming console, which may be utilized to communicate with a gaming headset with parental control, in accordance with various exemplary embodiments of the disclosure.

Certain embodiments of the disclosure may be found in a method and system for a headset with parental control. In accordance with various embodiments of the disclosure, a headset such as a gaming headset may receive a plurality of audio channels during play of a particular game. The gaming headset may determine an identity and/or an age of a gamer that is wearing the gaming headset, and configures operation of the gaming headset based on the determined identity and/or age of the gamer. The person wearing the gaming headset may be referred to as a gamer. The gaming headset may log into the particular game utilizing credentials associated with the determined identity and/or age of said gamer that is wearing the gaming headset, and may select one or more settings based on the determined identity and/or age of the gamer that is wearing the gaming headset. The settings include a list of words to be filtered out of the received plurality of audio channels. The headset may present a game channel and mute a chat channel in instances when the age of the gamer is below a threshold. One or more sensors communicatively coupled to the gaming headset may be activated and information received from the activated sensors may be utilized by the gaming headset to determine the identity and/or the age of the gamer that is wearing the gaming headset. The sensors may determine, for example, the head size, ear size, voice characteristics and/or biometric information for the gamer that is wearing the gaming headset. The gaming headset may establish a communication link with a headset accessory that may be attached to the gaming headset. Each gamer that utilizes the headset accessory has a uniquely assigned headset accessory. The gaming headset may acquire information from the attached headset accessory, and the acquired information may be utilized to determine the identity and/or age of a gamer, configure operation of the gaming headset, and/or configure the parameter settings to be used for the particular game and/or gamer. The parameter settings configured/selected for the particular game and/or gamer may comprise, for example, volume limit settings, profanity limit settings, voice morph settings, equalizer settings, parental control information, and/or gamer preference settings.

Sometimes during game play, the game audio and/or chat audio associated with playing a game, which may be referred to as game play, may comprise language, scenes, and/or situations that may not be suitable for a gamer that is playing the game. Unsuitable language may comprise, for example profane language. This profane language may be unsuitable for certain classes of gamers based on, for example, identity, age, maturity, moral preferences, cultural habits and/or religious beliefs. For example, parents may not want gamers who may be under a certain age and/or maturity level to hear these profanities or be exposed to various sexual content. In another example, gamers may have religious and/or moral objections to hearing the profane language or viewing certain sexual content. In the instant application, profane language may be referred to as profanity. Profanity may comprise, for example a single word, a plurality of words, a phrase, an acronym and/or one or more syllables. Accordingly, in various exemplary embodiments of the disclosure, the operation of a headset such as a gaming headset may be configured based on, for example, a determined identity, age, and/or level of maturity of a gamer that is wearing the headset. For example, the headset may provide parental control based on the determined identity, age, and/or level of maturity of the gamer that is wearing the headset.

FIG. 1A is a diagram that depicts an example gaming console, which may be utilized to communicate with a gaming headset with parental control, in accordance with various exemplary embodiments of the disclosure. Referring to FIG. 1A, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 112, 138, 140, 142, 144, 146, 152, 136, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the device 192 (FIG. 1C) and/or part of one or more software applications running on the device 192 (FIG. 1C).

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console 176 and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuit. The game console 176 sends audio to the audio subsystem 110 via link(s) 122 (e.g., S/PDIF for digital audio or "line out" for analog audio). Additional details of an example audio subsystem 110 are described below.

In accordance with various embodiments of the disclosure, in instances where the audio subsystem 110 may comprise a headset such as a gaming headset, the headset may be operable to receive a plurality of audio channels comprising game audio channels and/or a chat audio channel. The game audio channels and the chat audio channel may be received via the game console 176 during play of a particular game. The headset may be operable to determine one or more characteristics of a user (e.g., a gamer) that is wearing the headset. Example characteristics include identity, age, and/or maturity level. The headset may be operable to configure or control its operation based on the determined characteristic(s) of the user that is wearing the gaming headset and/or on characteristics (e.g., title, maturity rating, etc.) of the particular game being played.

Figure 1B:
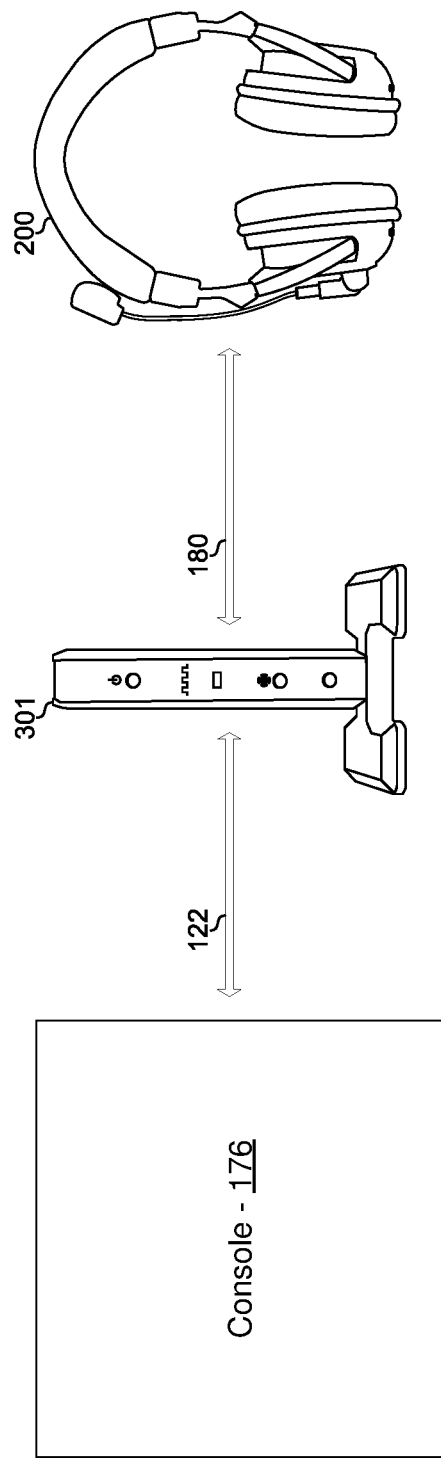
FIG. 1B is a diagram that depicts an example gaming audio subsystem comprising a headset and an audio basestation, in accordance with various exemplary embodiments of the disclosure.
Figure 1C:
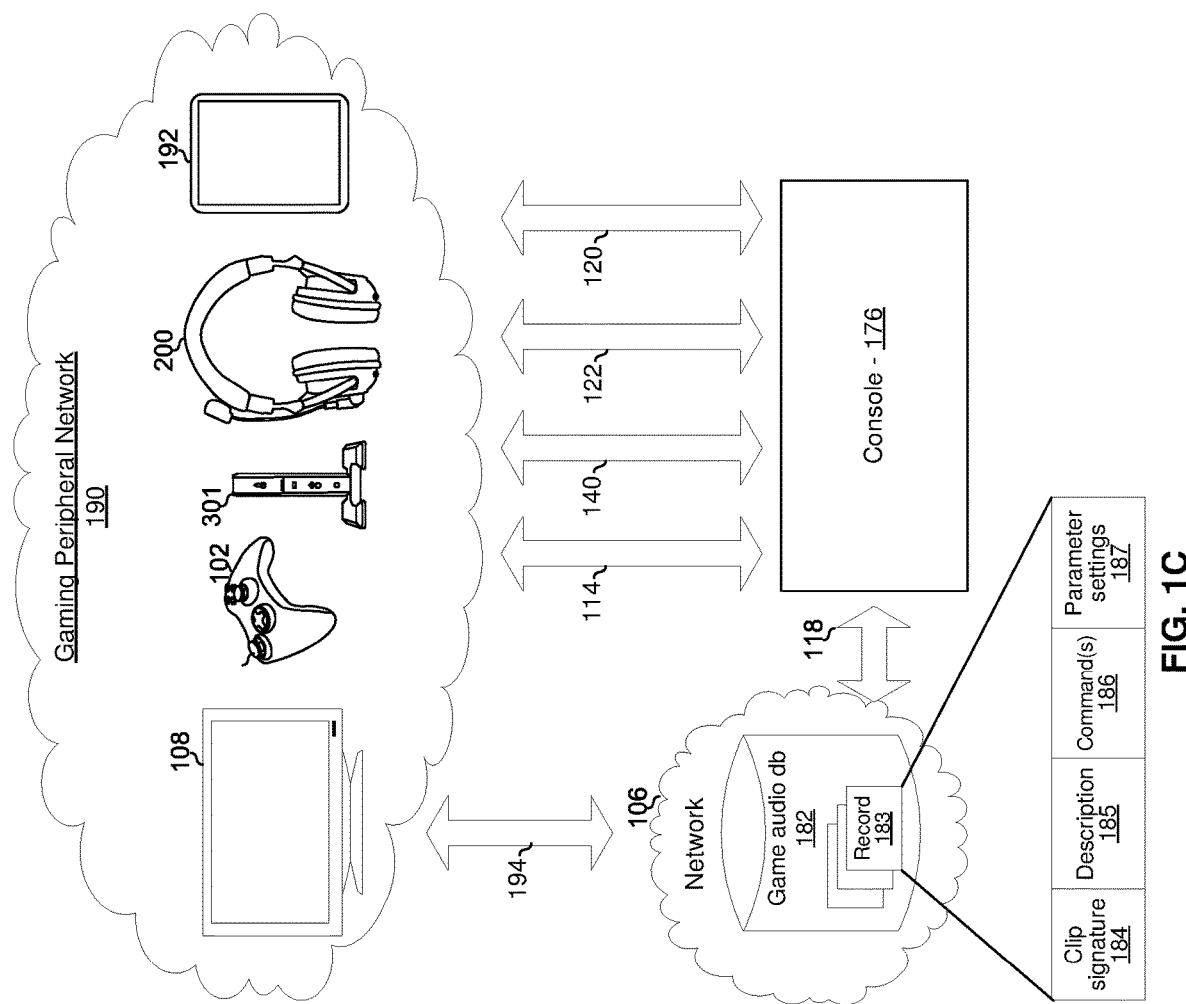
FIG. 1C is a diagram of an exemplary gaming console and an associated network of peripheral devices, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

In operation, the headset 200 may be operable to receive game audio channels and a chat audio channel during play of a particular game. The headset 200 may be operable to determine one or more characteristics of a gamer that is wearing the headset 200. For example, the headset 200 may be operable to acquire information from a headset accessory that may be attached to the headset 200 and/or from one or more sensors that may be communicatively coupled to the headset 200. The headset 200 may analyze the acquired information in order to determine the characteristic(s) of a gamer that is wearing the headset 200. The headset 200 may be operable to configure, control, and/or manage its operation based on the determined characteristic(s) of the gamer that is wearing the gaming headset. In this regard, the headset 200 may be operable to establish one or more parental controls and/or user preference controls based on the determined identity, age, and/or maturity level of the gamer that is wearing the gaming headset.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. A headset administrator may use the GUI for configuring parameter settings of the headset 200 to implement desired user restrictions/permissions for each of one or more users associated with the headset 200. For example, a parent may configure the headset 200 to use first parameter settings for an older child and second parameter settings for a younger child. As another example, a parent may configure headset 200 to use first parameter settings for a first user during certain hours and second settings for the first user during other hours. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprint") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
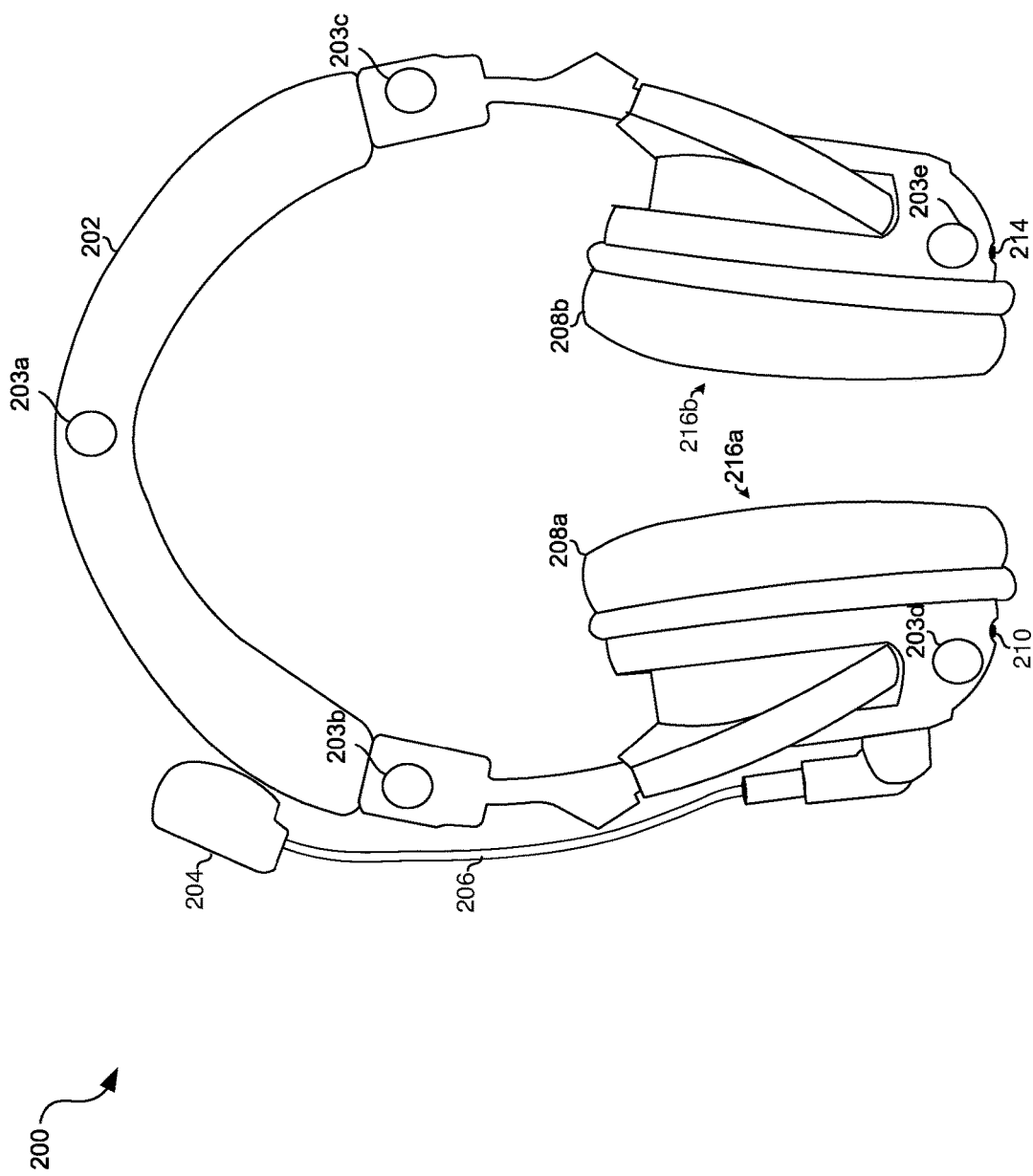
FIGS. 2A and 2B are diagrams that depict two views of an example embodiment of a gaming headset, in accordance with various exemplary embodiments of the disclosure.
Figure 2B:
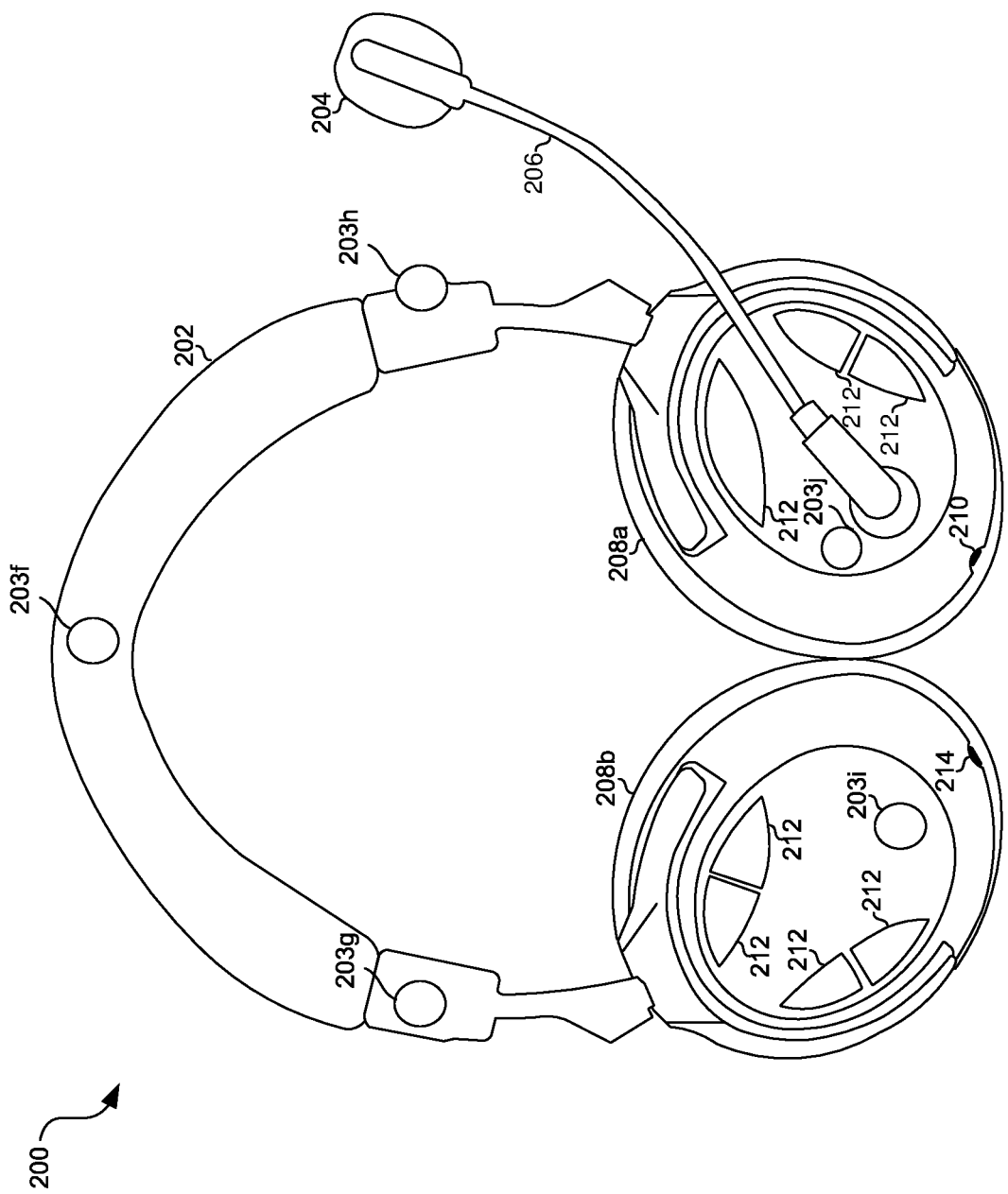

FIGS. 2A and 2B are diagrams that depict two views of an example embodiment of a gaming headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212. The headset 200 may also comprise a plurality of sensors, namely, 203a, 203b, 203c, 203d, 203e, 203f, 203g, 203h, 203i, 203j. The plurality of sensors 203a, 203b, 203c, 203d, 203e, 203f, 203g, 203h, 203i, 203j are collectively and individually referenced as sensor(s) 203. The sensors 203a, 203b, 203c, 203d, 203e are illustrated in FIG. 2A and the environment sensors 203f, 203g, 203h, 203i, 203j are illustrated in FIG. 2B.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset 200.

The speakers 216a and 216b may comprise circuitry that may be operable to convert electrical signals to sound waves. In accordance with various embodiments of the disclosure, the audio processing circuitry 230 may be operable to generate an alert signal that is converted to an audio alert by speakers 216a and 216b. Such an alert signal may be generated whenever a particular condition is detected by one or more of the sensors 203. In some embodiments of the disclosure, game play audio may be muted in one or both of the speakers 216a and 216b when certain conditions are detected by the environment sensors 203.

The user controls 212 may comprise dedicated and/or programmable buttons, switches, sliders, wheels, etc., for performing various functions. Example functions which the controls 212 may be configured to perform may include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engaged in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

The sensors 203 may comprise suitable logic, circuitry, interfaces and/or code that may be operable to sense the surrounding environment of the headset 200. One or more of the sensors 203 may comprise environmental sensors. Exemplary sensors may comprise, for example, a camera, a gyroscope, an accelerometer, a motion sensor, a biometric sensor, a microphone, a heat sensor, an infrared sensor, range detector, and so on. One or more of the microphones (e.g., microphone 204 and/or one or more other microphones represented as a sensor 203) may be directional so that the direction of a detected sound may be determined. The sensed information from the environment sensors 203 may be analyzed or assessed in order to determine the conditions of the surrounding environment of the headset 200. The information from the sensors 203 may be combined in order to get a more accurate sense of the conditions of the surrounding environment of the headset 200 and/or the gamer that may be wearing the headset 200. For example, the sensor 203, which may be a camera, may be operable to utilize face detection to determine the identity of a particular user that is wearing the headset 200. As another example, voice recognition may be performed on audio from the microphone 204 (or 203) to determine the identity of the particular user wearing the headset 200. As yet another example, a heat signature from an infrared sensor 203 may be used to determine head size and/or ear size, which in turn may be used to determine and/or estimate the age and/or identity of the gamer that is wearing the headset 200. The environment sensors 203 may be positioned at different locations of the headset 200 in order to determine the surrounding environment in front of, to the rear of, and/or to the sides of the listener of the headset.

The operation of the headset 200 may be configured or adjusted based on the detected or determined identity of the gamer that may be wearing the headset 200.

For example, the headset 200 may acquire and analyze information received from one or more of the sensors 203 in order to determine an identity, level of maturity and/or an age of the gamer that is wearing the headset 200. In this regard, the information the sensors 203 may be analyzed and utilized to determine, for example, the head size, ear size, voice characteristics and/or biometric information for the gamer that is wearing the headset 200.

Figure 2C:
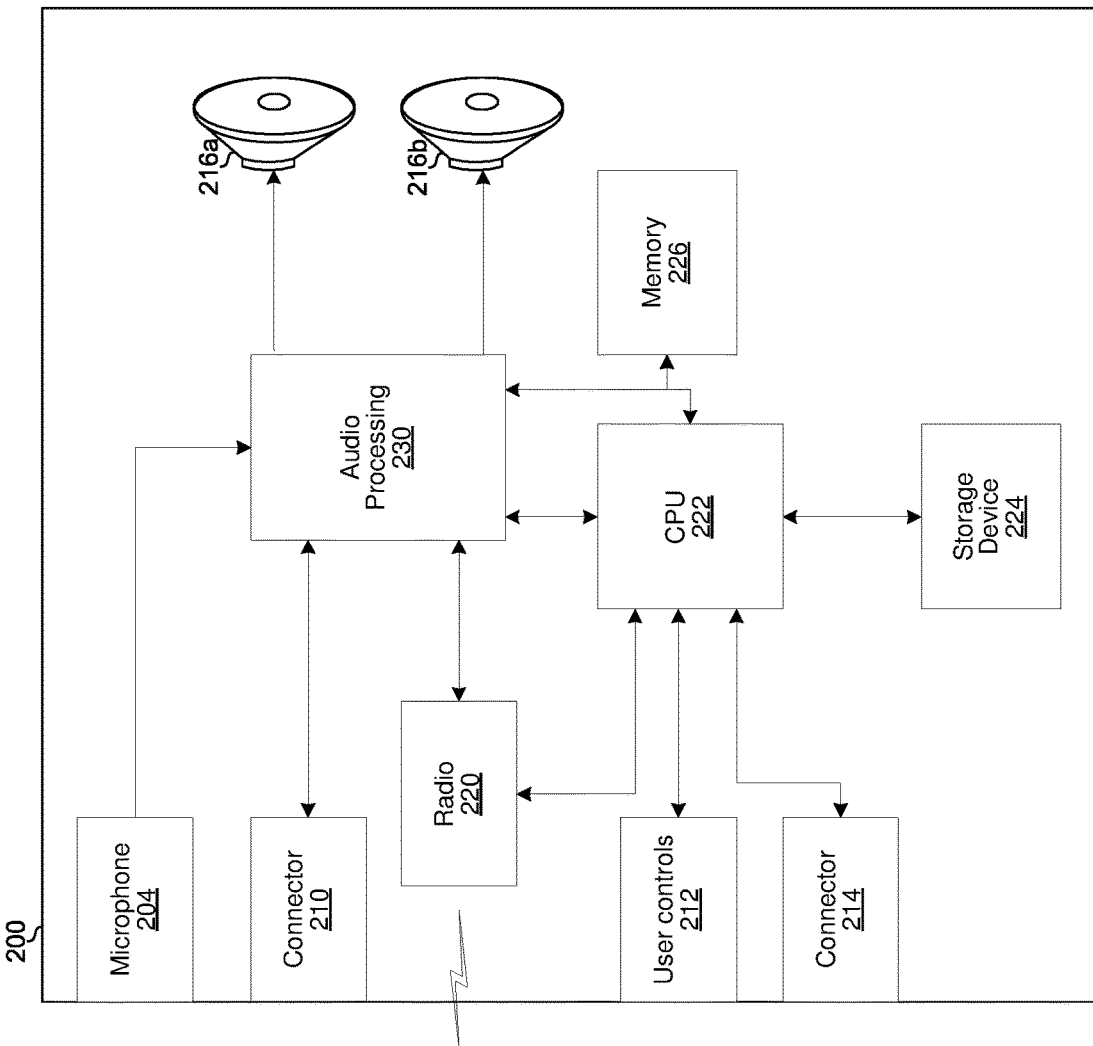
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to configure, control, and/or manage operation of the headset 200. In this regard, the CPU 222 may be operable to determine one or more characteristics of the gamer that is wearing the headset 200. Based on the determined characteristic(s) of the gamer that is wearing the headset 200, the CPU 222 may be operable to configure and/or select one or more parameter settings (including game options) which control operation of the headset 200. The CPU 222 may be operable to configure the headset 200 to acquire for example, information from a headset accessory that may be coupled to the headset 200. The CPU 222 may also be operable to configure or activate one or more sensors, which are utilized to acquire information. The CPU 222 may be operable to analyze the information from the headset accessory and/or from the one or more sensors to determine characteristics of a gamer wearing the headset 200, and characteristics (e.g., title, genre, maturity rating, etc.) for the game being played. The CPU 222 may be operable to utilize information that may be stored in the storage device 224 or an external storage device to configure, manage and/or control the of operation headset 200. The CPU 222 may also be operable to store, in the storage device 224 and/or in an external storage device to control, information (e.g., parameter settings and/or a data structure indicating which parameter settings are applicable to which users and/or which games) that may be utilized to control, configure and/or manage operation of the headset 200. For example, information specific to each gamer that utilizes the headset 200 may be stored in the storage device 224 and/or in the external storage device (e.g., using a GUI running on a device 192 that is connected to the headset 200 and/or using the controls 212 of the headset 200).

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). As another example, one or more parameter settings may determine user restrictions/permissions such as which games each user of the headset 200 is permitted to play, which users of the headset 200 are permitted to hear chat audio for which games, which words are to be filtered out for each user of the headset 200, and/or the like. Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), based on input received via one or more of the connectors 210 and 214, and/or based on determined characteristics of a user wearing the headset 200.

The storage device 224 may store information (e.g., parameter settings and/or a data structure indicating which parameter settings are applicable to which users and/or which games) that may be utilized to control, configure and/or manage operation of the headset 200. In one embodiment of the disclosure, the headset 200 may be operable to download information for a particular game, and for a particular gamer, from a database in an external storage device and store the downloaded information in the storage device 224. The external storage device may be located at a remote server (e.g., database 182 in FIG. 1C) or may be an external memory device, for example. In this regard, the CPU 222 may be operable to configure the radio 220 to download the information for the particular game and the particular gamer. Upon subsequent play of that particular game, by that particular gamer, the headset 200 does not need to re-download the audio information for that particular game from the database but may instead acquire the information for that particular game, for that particular user, from the storage 224. The CPU 222 may be operable to ensure that any updates to the database may be downloaded from the database and saved in the storage device 224 to ensure that the information for the particular game, for the particular gamer, is kept up-to-date.

The memory 226 may comprise suitable logic, circuitry, interfaces and/or code that may comprise volatile memory used by the CPU 222 and/or audio processing circuit 230 as program memory, for storing runtime data, and so on. In this regard, the memory 226 may store information and/or data that may be utilized to control, configure and/or manage operation of the CPU 222 to perform signal analysis on the information that may be received from one or more sensors that may be communicatively coupled to the headset 200. The signal analysis may be utilized to determine various characteristics of the gamer that is wearing the headset 200.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216a and 216b. Additionally, or alternatively, the processing may be performed on chat audio that is subsequently output to the connector 210 and/or radio 220.

In operation, the CPU 222 may be operable to establish a communication link with the headset accessory, which may be coupled to the headset 200. The CPU may be operable to acquire information from a headset accessory via the established communication link. The CPU 222 may also be operable to configure or activate one or more sensors, which may be communicatively coupled to the headset 200 in order to acquire information about the gamer that is wearing the headset 200. The CPU 222 may be operable to perform signal analysis on the information that may be received from the one or more sensors. The CPU 222 may also be operable to analyze the information from the headset accessory and/or from the one or more sensors. Based on the analysis of the information received from the one or more sensors and/or the headset accessory, the CPU 222 may determine characteristics of, preferences of, and/or restrictions/permissions applicable to a gamer wearing the headset 200. The CPU 222 may be operable to configure, control, and/or manage operation of the headset 200 based on the determined characteristics, preferences, and/or restrictions/permissions for the gamer wearing the headset 200. In an exemplary embodiment of the disclosure, the CPU 222 may be operable to configure one or more of volume limit settings, profanity limit settings, voice morph settings, equalizer settings, game permission/restriction settings, audio channel permission/restriction settings, and/or gamer preference settings for the headset 200.

Figure 3A:
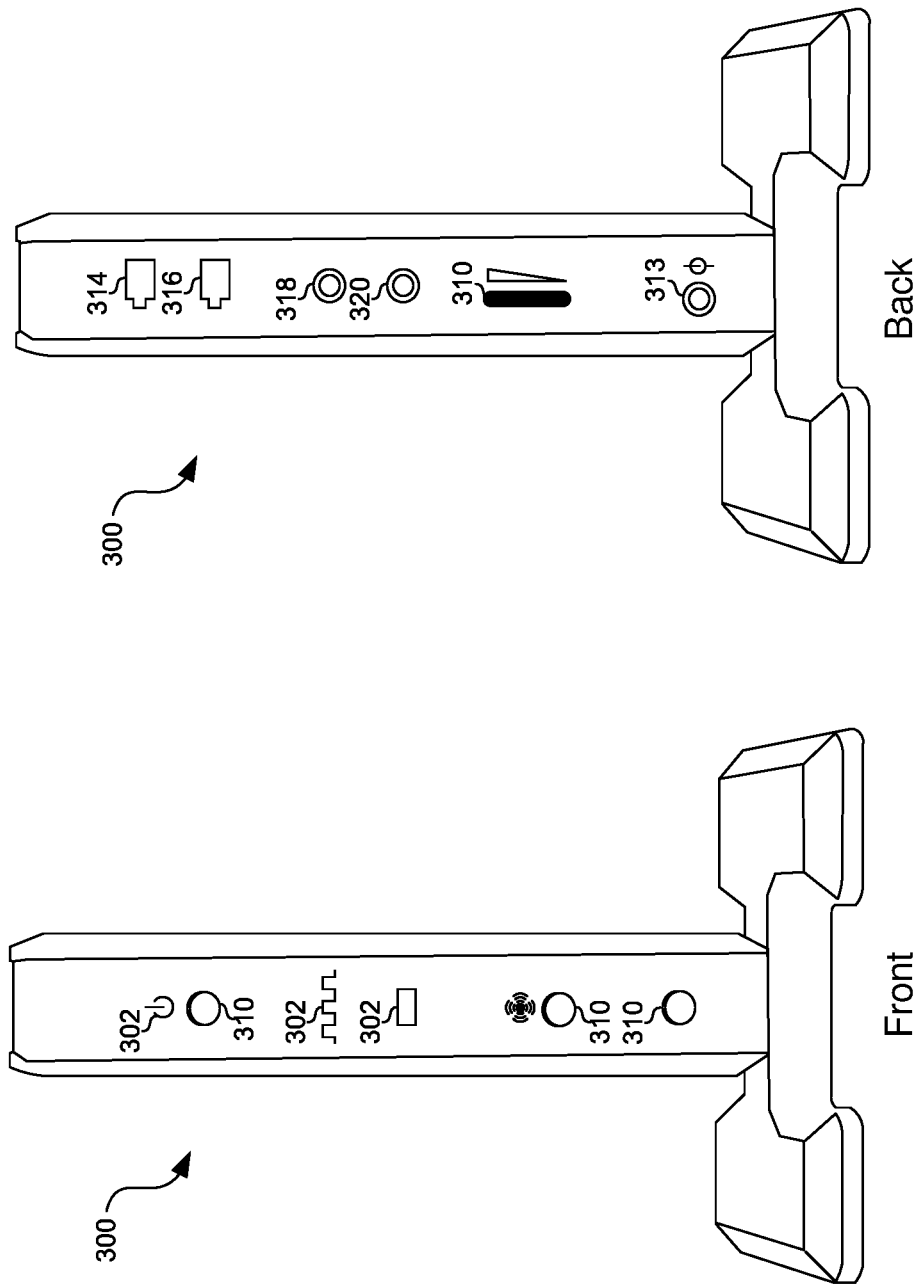
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 313, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
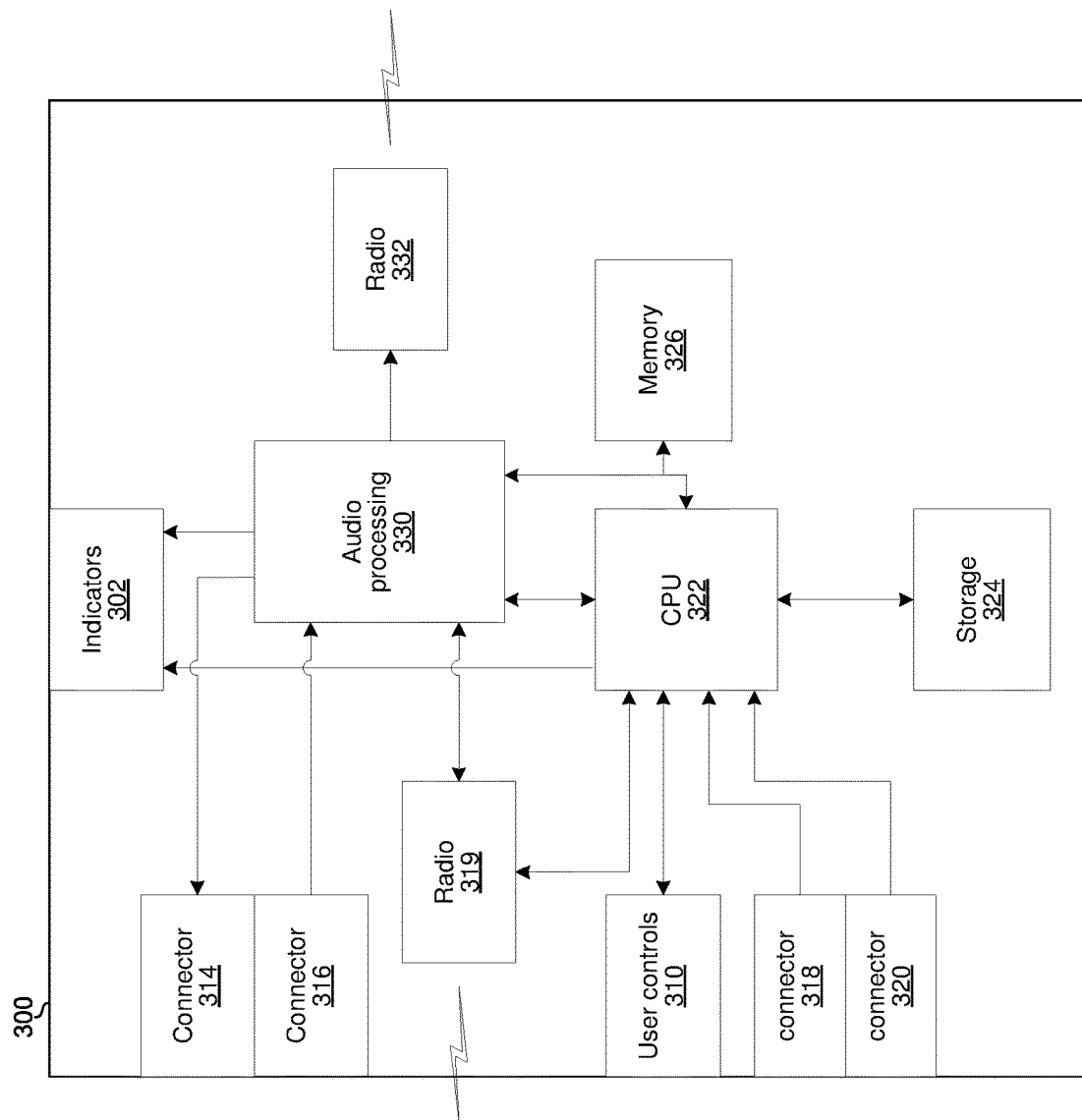
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 319, an audio processing circuit 330, and a radio 332.

The radio 319 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
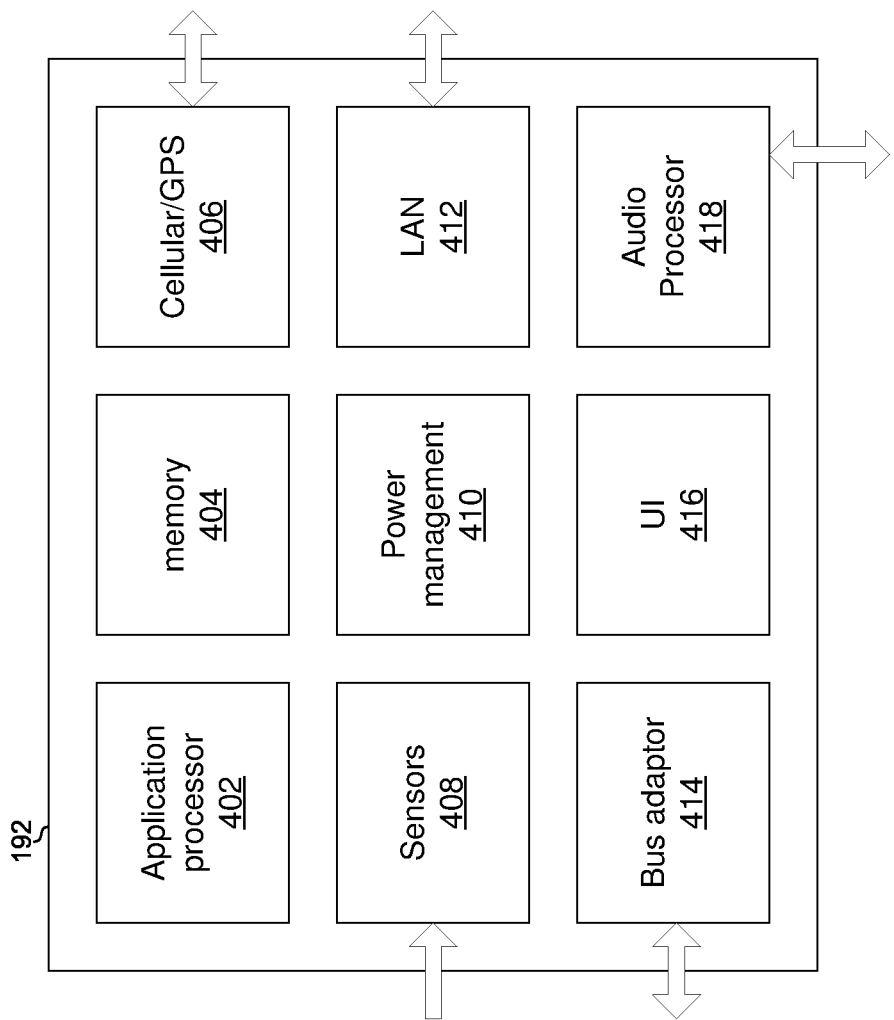
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The LAN subsystem 412 comprises suitable logic, circuitry, interfaces and/or code that may be operable to perform baseband processing and analog/RF processing for transmission and reception of wired, optical, and/or wireless signals (e.g., in accordance with Wi-Fi (IEEE 802.11 and variants thereof 802.11 e.g., a, b, g, n, ac, q, Wi-Fi Direct), Bluetooth, Ethernet, and/or other standards).

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The cellular/GPS networking subsystem 406 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
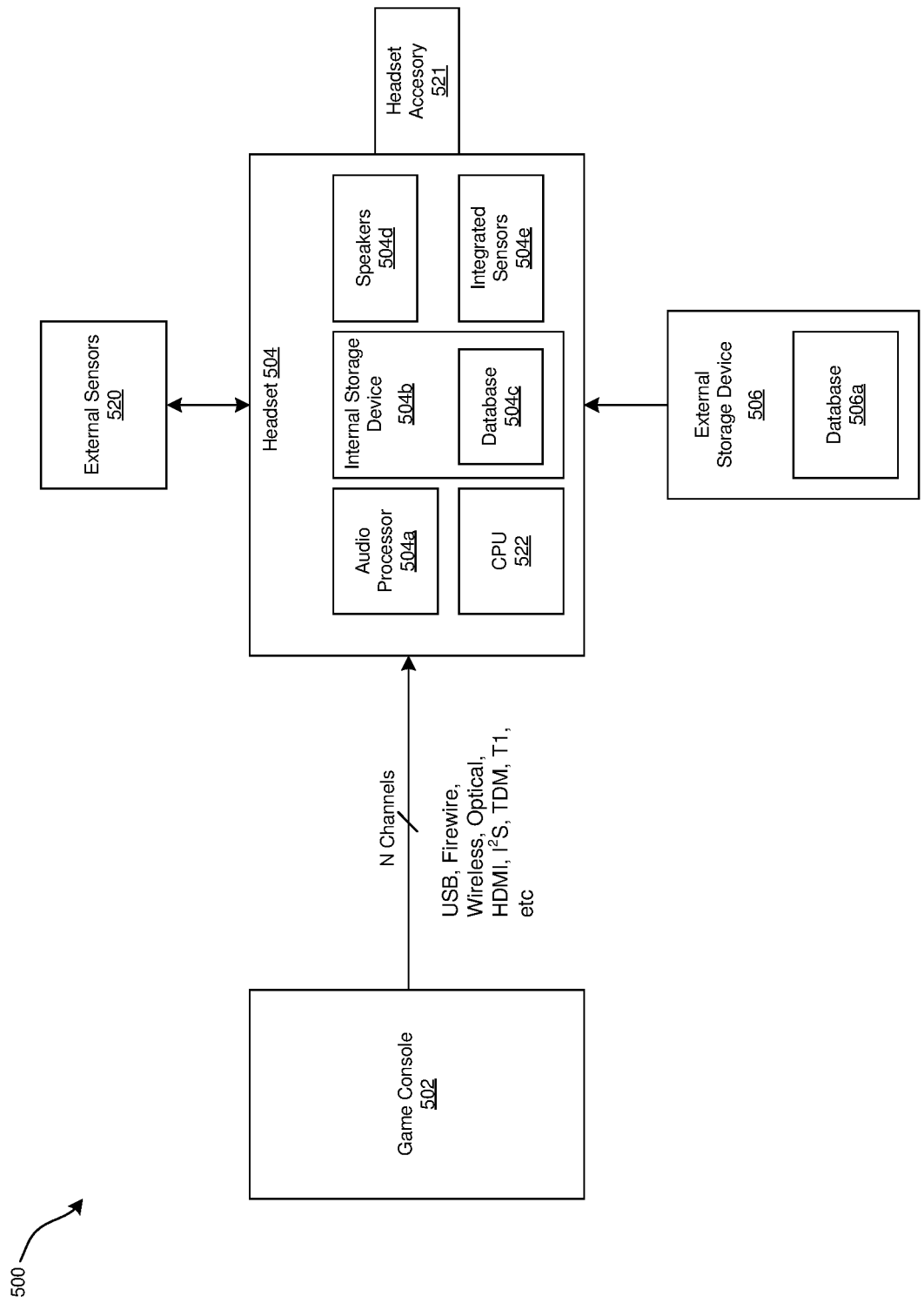
FIG. 5 is a block diagram illustrating an exemplary subsystem that may be utilized for configuring a gaming headset based on a determined characteristic of a user, in accordance with an embodiment of the disclosure.

FIG. 5 is a block diagram illustrating an exemplary subsystem that may be utilized for configuring a gaming headset based on a determined characteristic of a user, in accordance with an embodiment of the disclosure. Referring to FIG. 5, there is shown a subsystem 500 comprising a game console 502, a headset 504, and an external storage device 506. The headset 504 may comprise an audio processor 504a, an internal storage device 504b, speakers 504d, integrated sensors 504e and a CPU 522. The internal storage device 504b may comprise a database 504c. The external storage device 506 may comprise a database 506a. FIG. 5 also shows external sensors 520 and a headset accessory 521.

The game console 502 may comprise suitable logic, circuitry, interfaces and/or code that may be operable to present a game to, and also enable game play interaction between, one or more local players and/or one or more remote players. The game console 502 may be substantially similar to the game console 176, for example, which is shown and described with respect to FIG. 1A. The game console 502 may be operable to generate output video signals for a game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel. The game console 502 may also enable game chat over a game chat audio channel.

The headset 504 may comprise suitable logic, circuitry, interfaces and/or code that may be operable to receive the plurality of audio channels of game audio and/or chat audio. The headset 504 may be substantially similar to the headset 504, for example, which is shown and described with respect to FIGS. 2A, 2B and 2C. The headset 504 may be operable to determine characteristics of a gamer that may be wearing the headset 504. Based on the determined characteristics of the gamer that is wearing the headset 504, the CPU 522 may be operable to configure, control and/or manage the operation of the headset 504.

The integrated sensors 504e may comprise suitable logic, circuitry, interfaces and/or code that may be operable to sense the surrounding environment of the headset 504. The integrated sensors 504e may be substantially similar to the integrated sensors 203, for example, which are shown with respect to FIG. 2A and 2B. Exemplary sensors may comprise, for example, a camera, a gyroscope, an accelerometer, a motion sensor, a biometric sensor, a microphone, a heat sensor, an infrared sensor, range detector, and so on. The sensed information from the environment integrated sensors 504e may be analyzed or assessed by the CPU 522 in order to determine characteristics of the gamer that is wearing the headset 504.

The external sensors 520 may comprise suitable logic, circuitry, interfaces and/or code that may be operable to sense the surrounding environment of the headset 504. The external sensors 520 may be substantially similar to the sensors 504e, for example, which are shown with respect to FIGS. 2A and 2B. Exemplary sensors may comprise, for example, a camera, a gyroscope, an accelerometer, a motion sensor, a biometric sensor, a microphone, a heat sensor, an infrared sensor, range detector, and so on. The sensed information from the environment external sensors 520 may be analyzed or assessed by the CPU 522 in order to determine characteristics of the gamer that is wearing the headset 504. The external sensors 520 may be operable to communicate information wirelessly with the headset 504. For example, the external sensors 520 may be operable to utilize Bluetooth or variations thereof such as Bluetooth Low Energy (BLE) to communicate with the headset 504. In accordance with various embodiments of the disclosure, information from one or more of the integrated sensors 504e and/or the external sensors 520 may be utilized to determine the characteristics of the gamer that is wearing the headset 504.

The speakers 504d may be substantially similar to the speakers 216a and 216b, for example, which is shown and described with respect to FIGS. 2A, 2B and 2C.

The external storage device 506 may comprise one or more suitable devices having suitable logic, circuitry, interfaces and/or code that may be operable to store information for one or more games and/or for one or more gamers. The information may be stored in, for example, the database 506a.

The audio processor 504a may comprise suitable logic, circuitry, interfaces and/or code that may be operable to handle audio processing functions and operation for the headset 504. The audio processor 504a may be substantially similar to the audio processing circuit 230, for example, which is shown and described with respect to FIG. 1A.

The internal storage device 504b may comprise one or more suitable devices that may comprise suitable logic, circuitry, interfaces and/or code that may be operable to store information for a game for one or more games and/or for one or more gamers. The information may be stored in, for example, the database 504c. The internal storage device 504b may be substantially similar to the storage device 224, for example, which is shown and described with respect to FIG. 2C. Audio information for a particular game may be downloaded from the database 506a, which is in the external storage device 506, by the headset 504 via, for example, a wireless connection. The downloaded audio information may be stored in the database 504c, which is in the internal storage device 504b. The audio information may be retrieved from the internal storage device 504b when a game is initiated.

The headset accessory 521 may comprise suitable logic, circuitry, interfaces and/or code that may be operable to provide information for a particular gamer to the headset 504. The headset accessory 521 may be affixed to the headset 504 and may be operable to communicate information to the headset 504 via a communication link that is established between the headset 504 and the headset accessory 521. Each gamer that utilizes the headset 504 may have a unique headset accessory 521. Additional details for the headset accessory 521 may be found in the above incorporated U.S. patent application Ser. No. 14/263,210 titled "Electronic Headset Accessory."

The CPU 522 may comprise suitable logic, circuitry, interfaces and/or code that may be operable to execute instructions for controlling, managing and/or coordinating the overall operation of the headset 504. The CPU 522 may be substantially similar to the CPU 222, for example, which is shown and described with respect to FIG. 2C. In this regard, the CPU 222 may be operable to control, manage and/or coordinate operation of the components in the headset 504, which comprises the audio processor 504a, the internal storage device 504b, and the database 504c. The CPU 522 may also be operable to coordinate and/or manage operations between the headset 504, the game console 502, and the external storage device 506. The CPU 522 may also be operable to coordinate and manage operations for the database 504c and the database 506a.

The CPU 522 may be operable to establish a communication link with the headset accessory 521 that is attached to the headset 504. The CPU 522 may be operable to acquire information from the attached headset accessory 521. The information that may be acquired from the attached headset accessory 521 may be utilized to determine characteristics of a gamer, configure operation of the gaming headset, and/or configure parameter settings for the particular game and/or gamer. The settings may include, for example, a list of words to be filtered out of the received plurality of audio channels. The headset 504 may present a game channel and mute a chat channel in instances when the age of the gamer is below a threshold. Exemplary parameter settings selected for the particular game and/or gamer may comprise volume limit settings, profanity limit settings, voice morph settings, equalizer settings, parental control information, and/or gamer preference settings.

The CPU 522 may be operable to configure one or more of the integrated sensors 504e and/or external sensors 520 that may be communicatively coupled to the headset 504. The CPU 522 may be operable to acquire or otherwise receive information from one or more of the activated integrated sensors 504e and/or external sensors 520. The received information may be utilized by the CPU 522 to determine characteristics of the gamer that is wearing the headset 504. The integrated sensors 504e and/or external sensors 520 may be utilized to determine, for example, the head size, ear size, voice characteristics and/or biometric information for the gamer that is wearing the headset 504.

In operation, the CPU 522 may be operable to configure or activate one or more of the integrated sensors 504e and/or external sensors 520, which may be communicatively coupled to the headset 504. The CPU 522 may be operable to analyze the information received from one or more of the activated integrated sensors 504e and/or external sensors 520. The CPU 522 may be operable to establish a communication link with the headset accessory 521, which may be coupled to the headset 504. The CPU 522 may be operable to acquire information from a headset accessory via the established communication link. The CPU 522 may be operable to determine characteristics, preferences, and/or restrictions/permissions for a gamer wearing the headset 504 based on the analysis of the information received from one or more of the integrated sensors 504e and/or external sensors 520, and/or the headset accessory 521. The CPU 522 may be operable to determine the characteristics, preferences, and/or restrictions/permissions for a gamer wearing the headset 504 based on information that may be stored in the database 504c and database 506a. The CPU 522 may be operable to configure, control, and/or manage operation of the headset 504 based on the determined characteristics, preferences, and/or restrictions/permissions of the gamer wearing the headset 504. For example, the CPU 522 may be operable to configured volume limit settings, profanity limit settings, voice morph settings, equalizer settings, parental control information, and/or gamer preference settings for the headset 504 based on the determined characteristics and/or restrictions/permissions of the gamer wearing the headset 504.

In various embodiments of the disclosure, the headset 504 may be operable to combine information from the headset accessory 521 and information from the integrated sensors 504e and/or external sensors 520 in order to more accurately determine the characteristics of the gamer wearing the headset. Accordingly in instances where the gamer may be utilizing the wrong headset accessory 521, the information from one or more of the integrated sensors 504e and external sensors 520 may be utilized to determine that the identity of the gamer does not match the identity derived from the headset accessory 521. Accordingly, the headset 504 may trigger an alert and/or warning and/or the headset 504 may be rendered inoperable.

Figure 6:
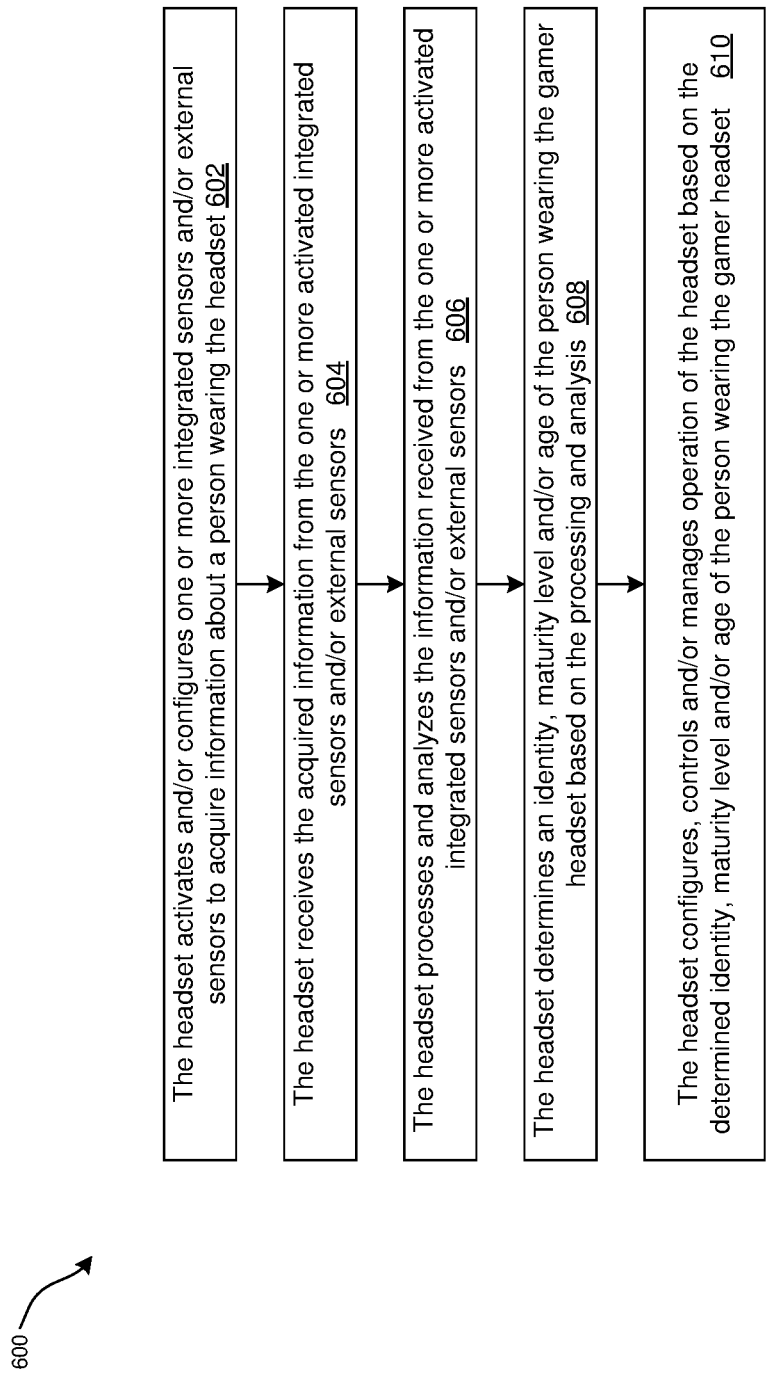
FIG. 6 is a flow diagram illustrating exemplary steps for configuring a gaming headset based on a determined characteristic of a user, in accordance with various exemplary embodiments of the disclosure.

FIG. 6 is a flow diagram illustrating exemplary steps for configuring a gaming headset based on a determined characteristic of a user, in accordance with various exemplary embodiments of the disclosure. Referring to FIG. 6, there is shown a flow chart 600 comprising a plurality of exemplary steps, namely, 602 through 610. In step 602, the headset 504 may be operable to activate and/or configure one or more integrated sensors 504e and/or external sensors 520 to acquire information about a person wearing the headset. In step 604, the headset 504 may be operable to receive the acquired information from the one or more activated integrated sensors 504e and/or external sensors 520. In step 606, the headset 504 may be operable to process and analyze the information received from the one or more activated integrated sensors 504e and/or external sensors 520. In step 608, the headset 504 may be operable to determine one or more characteristics of the person wearing the headset based on the processing and analysis. In step 610, the headset 504 may be operable to configure, control and/or manage operation of the headset based on the determined characteristic(s) of the person wearing the headset.

Figure 7:
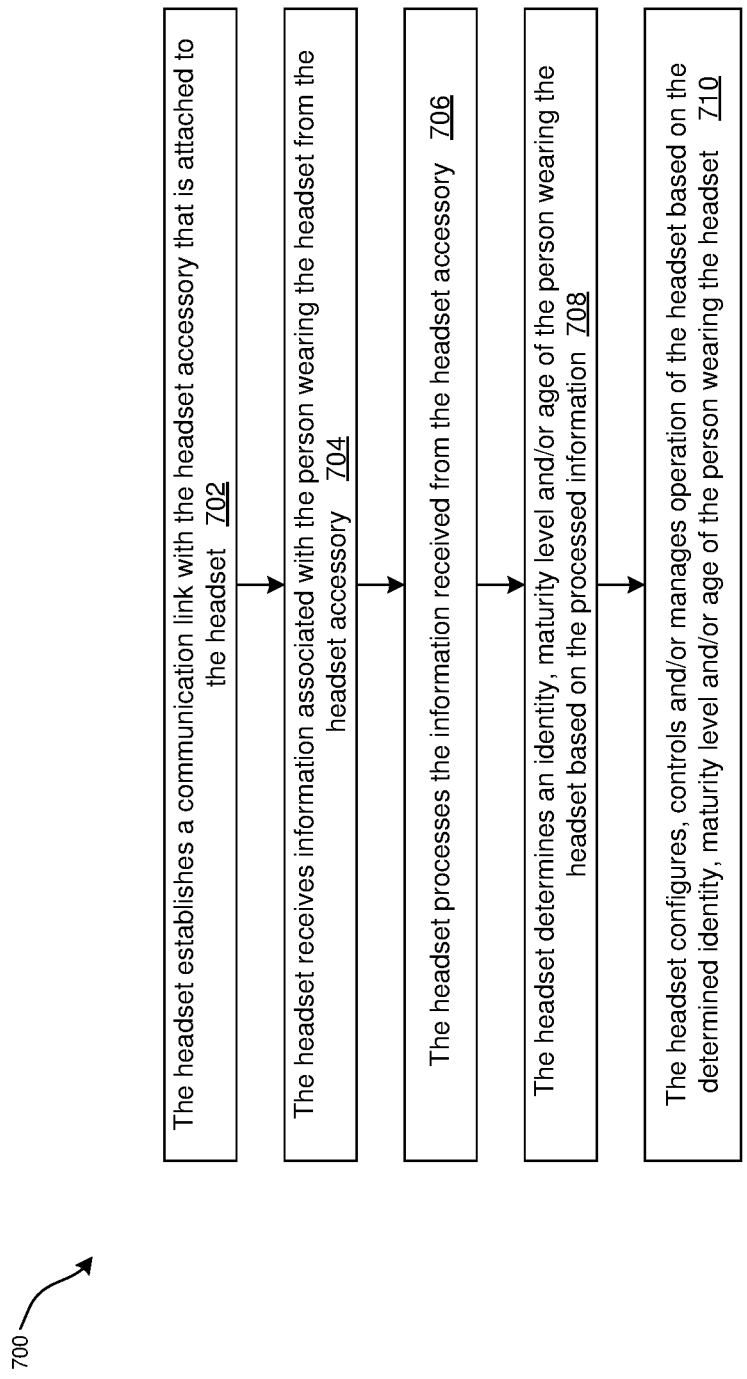
FIG. 7 is a flow diagram illustrating exemplary steps for configuring a gaming headset based on a determined characteristic of a user, in accordance with various exemplary embodiments of the disclosure.

FIG. 7 is a flow diagram illustrating exemplary steps for configuring a gaming headset based on a determined characteristic of a user, in accordance with various exemplary embodiments of the disclosure. Referring to FIG. 7, there is shown a flow chart 700 comprising a plurality of exemplary steps, namely, 702 through 710. In step 702, the headset 504 may be operable to establish a communication link with the headset accessory that is attached to the headset 504. In step 704, the headset 504 may be operable to receive information associated with the person wearing the headset 504 from the headset accessory 521. In step 706, the headset 504 may be operable to process the information received from the headset accessory 521. In step 708, the headset 504 may be operable to determine characteristic(s) of the person wearing the headset 504 based on the processed information. In step 710, the headset 504 may be operable to configure, control and/or manage operation of the headset 504 based on the determined characteristics of the person wearing the headset 504.

Figure 8:
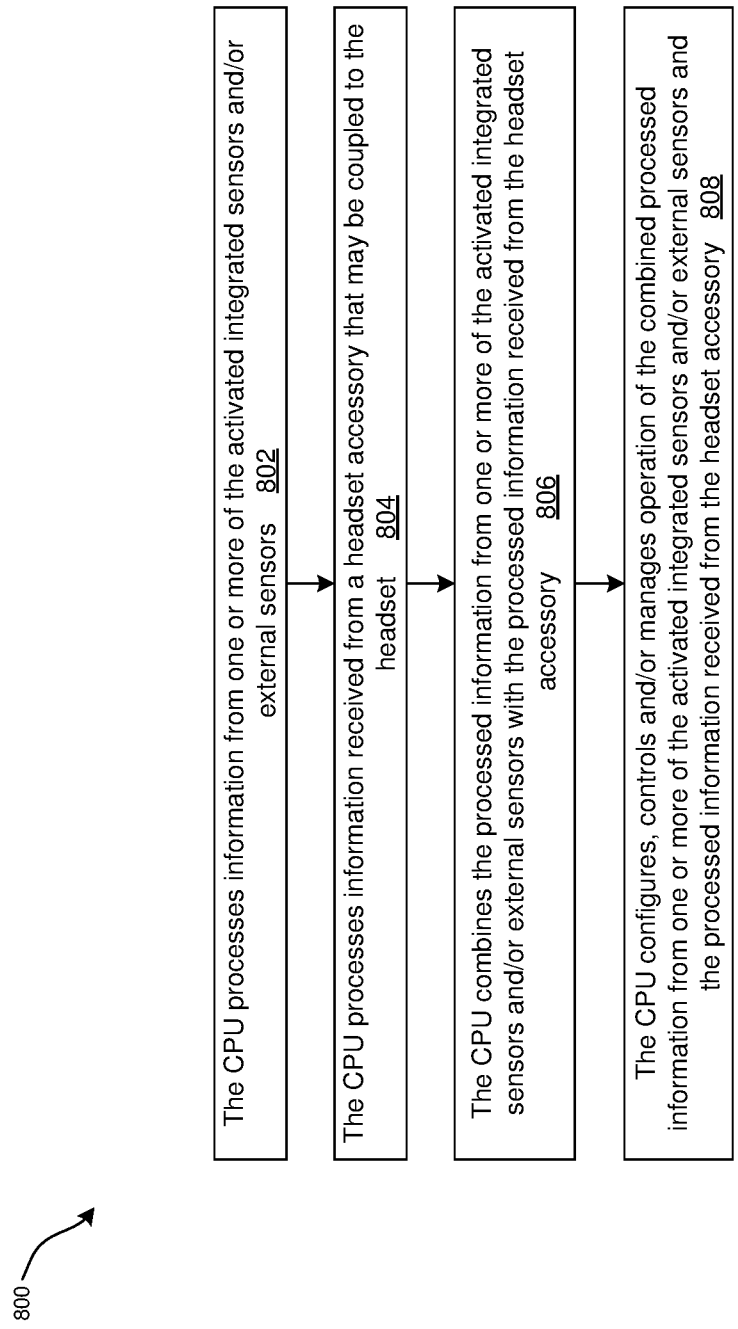
FIG. 8 is a flow diagram illustrating exemplary steps for configuring a gaming headset based on a determined characteristic of a user, in accordance with various exemplary embodiments of the disclosure.

FIG. 8 is a flow diagram illustrating exemplary steps for configuring a gaming headset based on a determined characteristic of a user, in accordance with various exemplary embodiments of the disclosure. Referring to FIG. 8, there is shown a flow chart 800 comprising a plurality of exemplary steps, namely, 802 through 808. In step 802, the CPU 522 may be operable to process information from one or more of the activated integrated sensors 504e and/or external sensors 520. In step 804, the CPU 522 may be operable to process information received from a headset accessory 521 that may be coupled to the headset 504. In step 806, the CPU 522 may be operable to combine the processed information from one or more of the activated integrated sensors 504e and/or external sensors 520 with the processed information received from the headset accessory 521. In step 808, the CPU 522 may be operable to configure, control and/or manage operation of the combined processed information from one or more of the activated integrated sensors 504e and/or external sensors 520 and the processed information received from the headset accessory 521.

In accordance with en exemplary embodiment of the disclosure, a gaming headset such as the headset 504 may be operable to receive a plurality of audio channels during play of a particular game. The headset 504 may be operable to determine an identity and/or an age of a gamer that is wearing the headset. The headset 504 may be operable to configure operation of the headset 504 based on the determined identity and/or age of the gamer. The headset 504 may be operable to log into the particular game using credentials associated with the determined identity and/or age of said gamer that is wearing the headset. The headset 504 may also be operable to select one or more parameter settings based on the determined identity and/or age of the gamer that is wearing the headset 504. The parameter settings may comprise a list of words to be filtered out of the received plurality of audio channels. The headset 504 may present a game channel and mute a chat channel when the age of the gamer is below a threshold.

In accordance with various embodiments of the disclosure, one or more sensors that may be communicatively coupled to the headset 504 may be activated. Information received from the one or more activated sensors may be utilized to determine the identity and/or the age of the gamer that is wearing the headset 504. The sensors may be operable to determine the head size, ear size, voice characteristics and/or biometric information for the gamer that is wearing the headset 504.

In accordance with various embodiments of the disclosure, the headset 504 may be operable to establish a communication link with a headset accessory that is attached to the headset 504. Each gamer that utilizes the headset accessory may have a uniquely assigned the headset accessory. The headset 504 acquires information from the attached headset accessory, and the information that is acquired from the attached headset accessory may be utilized to determine the identity and/or age of a gamer, configure operation of the headset, configure the parameter settings to be used for the particular game and/or gamer. The parameter settings to be used for the particular game and/or gamer may comprise, for example, volume limit settings, profanity limit settings, voice morph settings, equalizer settings, parental control information, and/or gamer preference settings.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   in a gaming headset that receives one or more audio channels during play of a particular game:
   determining, using circuitry in said gaming headset, an age of a gamer that is wearing said gaming headset, said circuitry in said gaming headset utilizing a sensor and an accessory coupled to the headset for determining said age, the accessory unique to the gamer; and
   configuring, using said circuitry in said gaming headset, operation of said gaming headset based on said determined age of said gamer.

2. The method according to claim 1, comprising logging into said particular game using credentials associated with said determined age of said gamer that is wearing said gaming headset.

3. The method according to claim 1, comprising selecting one or more settings to be used for said particular game based on said determined age of said gamer that is wearing said gaming headset.

4. The method according to claim 3, wherein said settings include a list of words to be filtered out of said received one or more audio channels.

5. The method according to claim 1, comprising, when said determined age of said gamer, or an age as known from said determined identity, is below a threshold, presenting a game channel of said one or more channels and muting a chat channel of said plurality of channels.

6. The method according to claim 1, wherein said determining comprises activating one or more sensors communicatively coupled to said gaming headset to determine said age of said gamer that is wearing said gaming headset.

7. The method according to claim 1, comprising acquiring information that is utilized for said determining said age of a gamer.

8. The method according to claim 1, comprising acquiring information that is utilized for said configuring operation of said gaming headset.

9. The method according to claim 1, wherein game parameter settings are received to be used for said particular game for said gamer, said game parameter settings comprising one or more of volume limit settings, profanity limit settings, voice morph settings, equalizer settings, parental control information, and/or gamer preference settings.

10. The method according to claim 1, wherein each gamer that utilizes said gaming headset accessory has a uniquely assigned accessory.

11. A system, comprising:
    in a gaming headset that receives one or more audio channels during play of a particular game, said gaming headset being operable to:
    determine, using circuitry in said gaming headset, an age of a gamer that is wearing said gaming headset, said circuitry in said gaming headset utilizing a sensor and an accessory coupled to the headset for determining said age, the accessory unique to the gamer; and
    configure, using said circuitry in said gaming headset, operation of said gaming headset based on said determined age of said gamer.

12. The system according to claim 11, wherein said gaming headset is operable to log into said particular game using credentials associated with said determined age of said gamer that is wearing said gaming headset.

13. The system according to claim 11, wherein said gaming headset is operable to select one or more settings to be used for said particular game based on said determined age of said gamer that is wearing said gaming headset.

14. The system according to claim 13, wherein said settings include a list of words to be filtered out of said received one or more audio channels.

15. The system according to claim 11, wherein said gaming headset is operable to present a game channel of said one or more channels and muting a chat channel of said plurality of channels, when said determined age of said gamer, or an age as known by said determined identity, is below a threshold.

16. The system according to claim 11, wherein said determining comprises activating one or more sensors communicatively coupled to said gaming headset to determine said age of said gamer that is wearing said gaming headset.

17. The system according to claim 11, wherein said gaming headset is operable to acquire information that is utilized for said determining said age of a gamer.

18. The system according to claim 17, wherein said gaming headset is operable to acquire information that is utilized for said configuring operation of said gaming headset.

19. The system according to claim 11, wherein said gaming headset is operable to receive game parameter settings to be used for said particular game for said gamer and comprising one or more of volume limit settings, profanity limit settings, voice morph settings, equalizer settings, parental control information, and/or gamer preference settings.

20. A non-transitory computer readable medium having stored thereon, a computer program having at least one code section that is executable by a machine for causing the machine to perform steps comprising:
- determining, using circuitry in a gaming headset, an age of a gamer that is wearing said gaming headset, said circuitry in said gaming headset utilizing a sensor and an accessory coupled to the headset for the determining, the accessory unique to the gamer; and
- configuring, using said circuitry in said gaming headset, operation of said gaming headset based on said determined age of said gamer.

* * * * *